US009277191B2

(12) United States Patent
Rodríguez et al.

(10) Patent No.: US 9,277,191 B2
(45) Date of Patent: Mar. 1, 2016

(54) SECURITY MONITORING SYSTEMS, METHODS AND DEVICES FOR ELECTRIC VEHICLE CHARGING STATIONS

(71) Applicant: Schneider Electric USA, Inc., Palatine, IL (US)

(72) Inventors: Marcela Verónica Arizpe Rodríguez, Monterrey (MX); Jose Filiberto Escamilla Cañedo, San Pedro Garza Garcia (MX); Karla Morena Guajardo Gonzalez, Monterrey (MX); Pablo Alejandro del Angel Marrufo, Monterrey (MX); Vladimir Cano Rodriguez, Apodaca (MX); Gerardo Rodriguez Najera, San Nicolas de los Garza (MX)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 481 days.

(21) Appl. No.: 13/712,050

(22) Filed: Dec. 12, 2012

(65) Prior Publication Data
US 2014/0160280 A1    Jun. 12, 2014

(51) Int. Cl.
*H04N 7/18*    (2006.01)

(52) U.S. Cl.
CPC ............. *H04N 7/188* (2013.01); *Y02T 10/7005* (2013.01)

(58) Field of Classification Search
None
See application file for complete search history.

(56) References Cited

U.S. PATENT DOCUMENTS

| | | | |
|---|---|---|---|
| 3,614,581 | A | 10/1971 | Frost |
| 3,775,659 | A | 11/1973 | Carlsen |
| 4,510,431 | A | 4/1985 | Winkler |
| 4,663,579 | A | 5/1987 | Yang |
| 5,204,611 | A | 4/1993 | Nor et al. |

(Continued)

FOREIGN PATENT DOCUMENTS

| | | |
|---|---|---|
| DE | 102010027050 | 1/2012 |
| EP | 2527214 | 11/2012 |

(Continued)

OTHER PUBLICATIONS

International Search Report of International Application No. PCT/US2013/074782—Date of Completion of Search: Mar. 26, 2014—3 pages.

(Continued)

*Primary Examiner* — William C Vaughn, Jr.
*Assistant Examiner* — Eileen Adams
(74) *Attorney, Agent, or Firm* — Locke Lord LLP

(57) ABSTRACT

Systems, methods and devices for monitoring an electric vehicle charging station (EVCS) are disclosed. A security system is disclosed for monitoring an EVCS having an electrical connector for electrically coupling to an electric vehicle. The security system includes a camera for recording images of a surrounding area of the EVCS. A sensor detects objects near the EVCS and/or detects removal of the electrical connector from the EVCS. A controller, which is operatively coupled to the camera and the sensor, is configured to: receive sensor signals output from the sensor; responsive to the sensor signals indicating that an object is near the EVCS or the electrical connector is removed from the EVCS: direct the camera to record images of the surrounding area of the EVCS; output to a user the images of the surrounding area of the EVCS; and, receive user command signals to control the EVCS and/or the security system.

20 Claims, 5 Drawing Sheets

(56) References Cited

U.S. PATENT DOCUMENTS

| | | |
|---|---|---|
| 5,306,999 A | 4/1994 | Hoffman |
| 5,536,173 A | 7/1996 | Fujitani et al. |
| 5,539,297 A | 7/1996 | Fiebig |
| 5,548,200 A | 8/1996 | Nor et al. |
| 5,583,418 A | 12/1996 | Honda et al. |
| 5,594,318 A | 1/1997 | Nor et al. |
| 5,629,601 A | 5/1997 | Feldstein |
| 5,751,135 A | 5/1998 | Fukushima et al. |
| 5,757,163 A | 5/1998 | Brotto |
| 5,934,918 A | 8/1999 | Wuechner |
| 5,955,868 A | 9/1999 | Kaite |
| 6,097,174 A | 8/2000 | Yang |
| 6,127,798 A | 10/2000 | Lansang |
| 6,288,518 B1 | 9/2001 | Yang |
| 6,445,159 B1 | 9/2002 | Ramsden |
| 6,777,913 B2 | 8/2004 | You |
| 7,181,409 B1 | 2/2007 | Murakami |
| 7,256,516 B2 | 8/2007 | Buchanan et al. |
| 7,999,506 B1 | 8/2011 | Hollar et al. |
| 8,019,483 B2 | 9/2011 | Keefe |
| 8,025,526 B1 | 9/2011 | Tormey et al. |
| 8,265,816 B1 | 9/2012 | LaFrance |
| 8,294,420 B2 | 10/2012 | Kocher |
| 2003/0024987 A1* | 2/2003 | Zhu ................................ 235/454 |
| 2009/0318774 A1 | 12/2009 | Ichikawa et al. |
| 2010/0010043 A1 | 1/2010 | Hanatani et al. |
| 2010/0134067 A1 | 6/2010 | Baxter et al. |
| 2010/0145717 A1 | 6/2010 | Hoeltzel |
| 2010/0204865 A1* | 8/2010 | Nakamura ....................... 701/22 |
| 2010/0211643 A1 | 8/2010 | Lowenthal et al. |
| 2010/0228405 A1 | 9/2010 | Morgal et al. |
| 2010/0256830 A1 | 10/2010 | Kressner et al. |
| 2010/0274656 A1 | 10/2010 | Genschel et al. |
| 2010/0274697 A1 | 10/2010 | Zyren |
| 2010/0280675 A1 | 11/2010 | Tate, Jr. et al. |
| 2010/0315197 A1 | 12/2010 | Solomon et al. |
| 2011/0025267 A1 | 2/2011 | Kamen et al. |
| 2011/0077809 A1 | 3/2011 | Leary |
| 2011/0171850 A1 | 7/2011 | Brown, II |
| 2011/0200193 A1 | 8/2011 | Blitz et al. |
| 2011/0202476 A1 | 8/2011 | Nagy et al. |
| 2011/0204847 A1 | 8/2011 | Turner |
| 2011/0213656 A1 | 9/2011 | Turner |
| 2011/0227531 A1 | 9/2011 | Rajakaruna |
| 2011/0239116 A1* | 9/2011 | Turner et al. ................... 715/705 |
| 2011/0254504 A1* | 10/2011 | Haddad et al. ................. 320/109 |
| 2012/0047971 A1 | 3/2012 | Katagiri et al. |
| 2012/0064755 A1 | 3/2012 | Ichio et al. |
| 2012/0083148 A1 | 4/2012 | Hirashita et al. |
| 2012/0109402 A1 | 5/2012 | Shelton et al. |
| 2012/0282974 A1* | 11/2012 | Green et al. ................. 455/550.1 |

FOREIGN PATENT DOCUMENTS

| | | |
|---|---|---|
| JP | 2011250587 | 12/2011 |
| JP | 2012019578 | 1/2012 |
| JP | 2012100417 | 5/2012 |

OTHER PUBLICATIONS

PCT Written Opinion of the International Searching Authority for International Application No. PCT/US2013/074782—Date of Completion of Search: Mar. 26, 2014—7 pages.

English Language Machine Translation of Japanese Patent Publication No. JP2012-100417—19 pages.

English Language Machine Translation of Japanese Patent Publication No. JP2012-19578—14 pages.

Dwegmull, "Tesla charging plug lock," Tesla Motors club, Tesla, Sep. 13, 2011. Downloaded from http://www.teslamotorsclub.com/showthread.php/6293-Tesla-charging-plug-lock, on Aug. 3, 2012 (4 pages).

* cited by examiner

SECURITY MONITORING SYSTEMS, METHODS AND DEVICES FOR ELECTRIC VEHICLE CHARGING STATIONS

TECHNICAL FIELD

The present disclosure relates generally to motor vehicles that are propelled in whole or in part by electricity, and more particularly to electrical charging stations for recharging such motor vehicles.

BACKGROUND

Most conventional motorized vehicles, such as the modern-day automobile, include a powertrain that operates to propel the vehicle and power the onboard vehicle electronics. The powertrain, which is sometimes referred to as a "drivetrain," is generally comprised of an engine that delivers driving power to the vehicle's final drive system (e.g., rear differential, axle, and wheels) through a multi-speed power transmission. Automobiles have traditionally been propelled solely by a reciprocating-piston-type internal combustion engine (ICE) because of its ready availability, relatively inexpensive cost, light weight, and overall efficiency. Such engines include compression-ignited diesel engines and spark-ignited gasoline engines.

Hybrid vehicles, in contrast, utilize alternative power sources to propel the vehicle, minimizing reliance on the engine for power, thereby increasing overall vehicle fuel economy. A hybrid electric vehicle (HEV), for example, generally employs one or more electric machines that operate individually or in concert with an internal combustion engine to propel the vehicle. An electric vehicle (EV), on the other hand, is propelled by one or more onboard electric motors without employing the propulsion power of an ICE. Most electric vehicles and hybrid electric vehicles use battery packs, often comprised of several individual battery modules, to provide current to the motor/generators that propel the vehicle and operate the vehicle accessories. As used herein, the term "electric vehicle" includes vehicles in which the powertrain uses only electrical power for propulsion and vehicles in which the powertrain uses both an electrical power source and/or an internal combustion engine for propulsion.

As electric vehicles become more popular and more prevalent, infrastructure is being developed and deployed to charge such electric vehicles. The charging of electric vehicles may be performed in a variety of different locations that have electric vehicle charging stations (EVCS). Electric vehicle supply equipment (EVSE), for example, can include an electric vehicle charging station owned by a vehicle owner (e.g., stowed in an owner's garage), electric vehicle charging stations deployed by retailers (e.g., at gas stations and dedicated electrical charging stations), and more sophisticated electric vehicle charging stations used by automobile service stations and dealers. Facility operators may find it desirable to monitor their filling station and the individual EVCS's to increase security and to prevent theft and damage. In addition, unlike conventional gas stations in which a patron can refill their gasoline tank in a matter of minutes, some present-day EVCS's require between three and eight hours to fully recharge an electric vehicle. Users may therefore find it desirable to recharge their electric vehicle without having to be physically present for the entire duration of the charging cycle. Unattended vehicles, however, are more susceptible to tampering, theft and damage. For the foregoing and other reasons, there is a need for improved monitoring, security and control means for electrical charging stations and EVCS's.

SUMMARY

Aspects of the present disclosure are directed to systems, methods and devices for monitoring an EVCS, its surrounding areas, and/or the vehicle being charged by the EVCS. Some implementations allow the owner of the vehicle and/or the operator of the charging facility to control an EVCS remotely. A potential benefit to vehicle owners is the ability to remotely monitor the status of their vehicle and its charge, for example, using a dedicated software application on his/her smartphone, tablet, or computer. A software application can enable the owner to: (a) view the electric vehicle and its surrounding areas; (b) change the field of view of one or more local security cameras (e.g., change the camera's direction and/or the focal length to zoom in or out); (c) monitor the status of vehicle charging; (d) receive alarms/notifications indicating completion of vehicle charging; and/or (e) enable/disable the charging process remotely. A potential benefit to facility operators is the ability to remotely monitor their filling station, an individual EVCS and its surrounding areas, as well as people and vehicles at the filling station. The facility owner/operator can be provided with a software application which allows them to: (a) detect a vehicle as it is parking at and/or using an EVCS (e.g., a picture of the license plate may be taken and stored for security purposes); (b) detect if someone is approaching/at an EVCS and record their actions; (c) receive alarms/notifications indicating vandalism or damage to the EVCS; (d) notify the police or independent security company; (e) change the field of view of one or more of the security cameras; (f) enable/disable the charging process remotely; and/or (g) identify stolen vehicles.

In accordance with one aspect of the present disclosure, a security system is disclosed for monitoring an EVCS. The EVCS has a connector dock and an electrical connector for electrically coupling to an electric vehicle. The security system includes a digital camera, a sensor, and a controller. The digital camera is configured to record images (e.g., convert an optical image into an electronic signal) of a surrounding area of the EVCS and output a camera signal indicative thereof. The sensor is configured to detect objects within a predetermined proximity of the EVCS and/or to detect removal of the electrical connector from the connector dock of the EVCS, and output a sensor signal indicative thereof. The controller, which is operatively coupled to the digital camera and the sensor, is configured to: receive the sensor signal output from the sensor; and, responsive to the sensor signal indicating that an object is within the predetermined proximity of the EVCS or the electrical connector is removed from the connector dock of the EVCS: direct the digital camera to record images of the surrounding area of the EVCS; output to a user the camera signal indicative of the images of the surrounding area of the EVCS; and, receive from the user a command signal that is operable to change an operational state of the EVCS and/or the security system.

Other aspects of the present disclosure are directed to a method of monitoring an EVCS with a security system having a sensor and a digital camera. The EVCS has a connector dock and an electrical connector for electrically coupling to an electric vehicle. The method includes: receiving from the sensor of the security system a first sensor signal indicating that an object is within a predetermined proximity of the EVCS, or a second sensor signal indicating that the electrical connector has been removed from the connector dock of the EVCS; and, responsive to receiving the first or the second sensor signal: directing the digital camera to record images of a surrounding area of the EVCS and output a camera signal indicative thereof; transmitting to a user the camera signal indicative of the images of the surrounding area of the EVCS; and, receiving from the user a command signal that is operable to change an operational state of the EVCS and/or the security system.

According to other aspects of the present disclosure, a security kit is presented for monitoring an EVCS having a housing, a connector dock, and an electrical connector, which is attached to the housing and is configured to electrically couple the EVCS to an electric vehicle. The security kit includes a digital camera and first and second sensors, all of which are configured to attach to the EVCS housing. The digital camera is configured to record images of a surrounding area of the EVCS and output a camera signal indicative thereof. The first sensor is configured to detect objects within a predetermined proximity of the EVCS and output a first sensor signal indicative thereof, whereas the second sensor is configured to detect removal of the electrical connector from the connector dock of the EVCS and output a second sensor signal indicative thereof. The security kit also includes a controller that is operatively coupled to the digital camera and the sensors. The controller, responsive to receiving the first sensor signal or the second sensor signal, is configured to: direct the digital camera to record images of the surrounding area of the EVCS; output to a user the camera signal indicative of the images of the surrounding area of the EVCS; and, receive from the user a command signal operable to change an operational state of the EVCS, the security kit, or both.

The above summary is not intended to represent each embodiment or every aspect of the present disclosure. Rather, the foregoing summary merely provides an exemplification of some of the novel and inventive features included herein. The above features and advantages, and other features and advantages of the present disclosure, will become readily apparent from the following detailed description of exemplary embodiments and various modes for carrying out the present invention when taken in connection with the accompanying drawings and appended claims.

DETAILED DESCRIPTION

Figure 1:
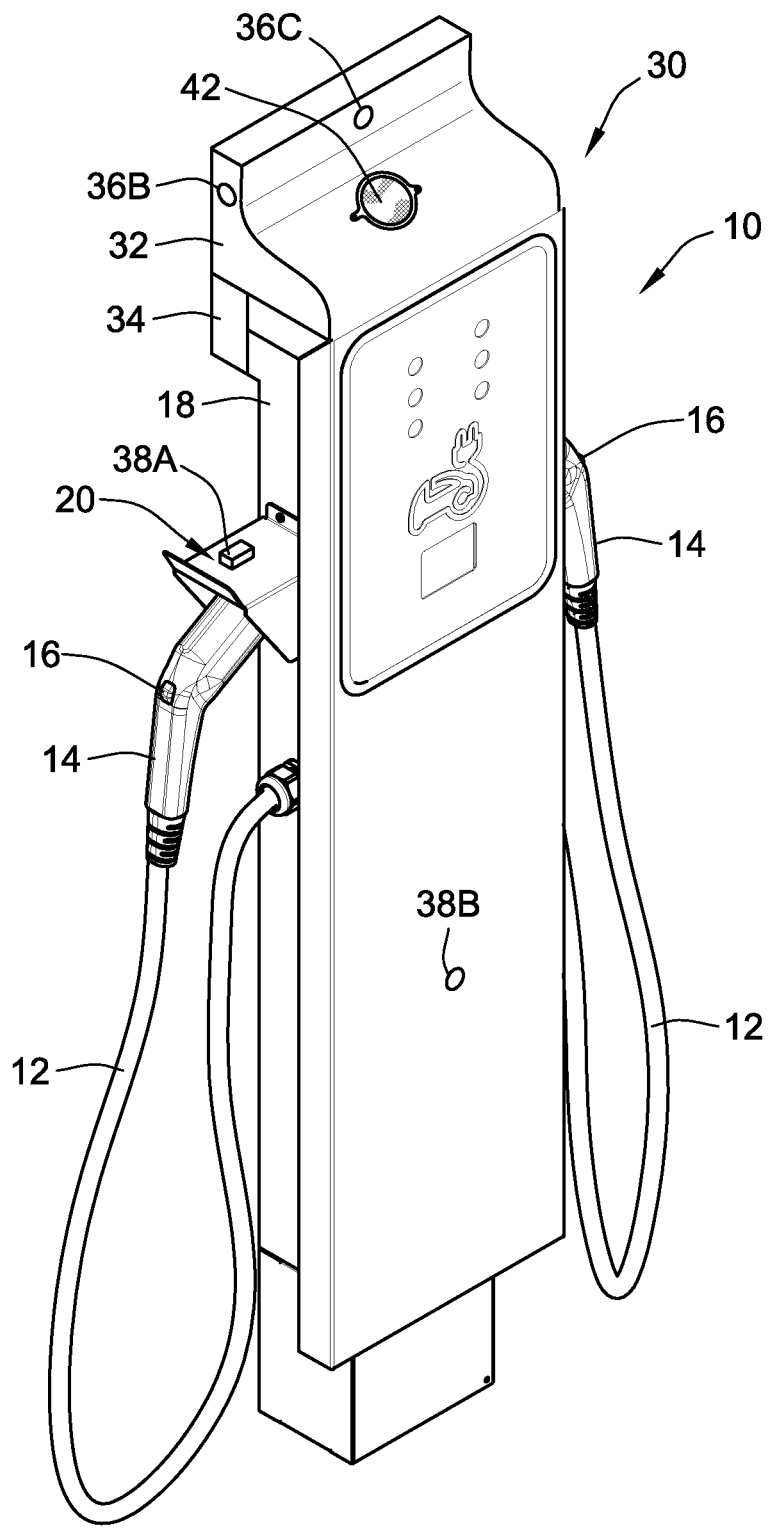
FIG. 1 is a perspective-view illustration of an exemplary electric vehicle charging station (EVCS) with a representative EVCS monitoring system in accordance with aspects of the present disclosure.

While this invention is susceptible of embodiment in many different forms, there are shown in the drawings and will herein be described in detail representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numerals refer to like components throughout the several views, there is shown in FIG. 1 an exemplary electric vehicle charging station (EVCS), designated generally at 10, with a representative EVCS monitoring system, designated generally at 30, in accordance with aspects of the present disclosure. In the illustrated embodiment, the EVCS 10 of FIG. 1 is a floor-mounted, all-season level II outdoor charging station that can be used in both residential and commercial applications. The EVCS 10 is non-limiting in nature and therefore may take on various other forms, such as EVLINK™ Level I, II and III charging stations, EVLINK™ DC Quick Charger stations, or EVLINK™ wall-mounted indoor charging stations, all of which are available from Schneider Electric USA, Inc., of Palatine, Ill., and are compatible with plug-in vehicles built per Society of Automotive Engineering (SAE) J1772 standards. The EVCS can be used to charge, for example, electric-hybrid vehicles (both series and parallel), full electric vehicles (EV), electric range extended vehicles (EREV), and any other motorized vehicle configuration utilizing, for example, a battery pack to supply power for propulsion of the vehicle. The inventive aspects of this disclosure, however, are not per se limited to the illustrated application. Moreover, only selected components of the EVCS 10 have been shown and will be described in additional detail hereinbelow. Nevertheless, the EVCS discussed herein can include numerous additional and alternative components, such as an AC/DC inverter, a DC/DC inverter, a battery, a diode bridge, a PFC module, a bus system, etc. Seeing as these components are well known in the art, they will not be described in further detail. Lastly, the drawings presented herein are not necessarily to scale and are provided purely for descriptive purposes; thus, the specific and relative dimensions shown in the drawings are not to be considered limiting.

Figure 2:
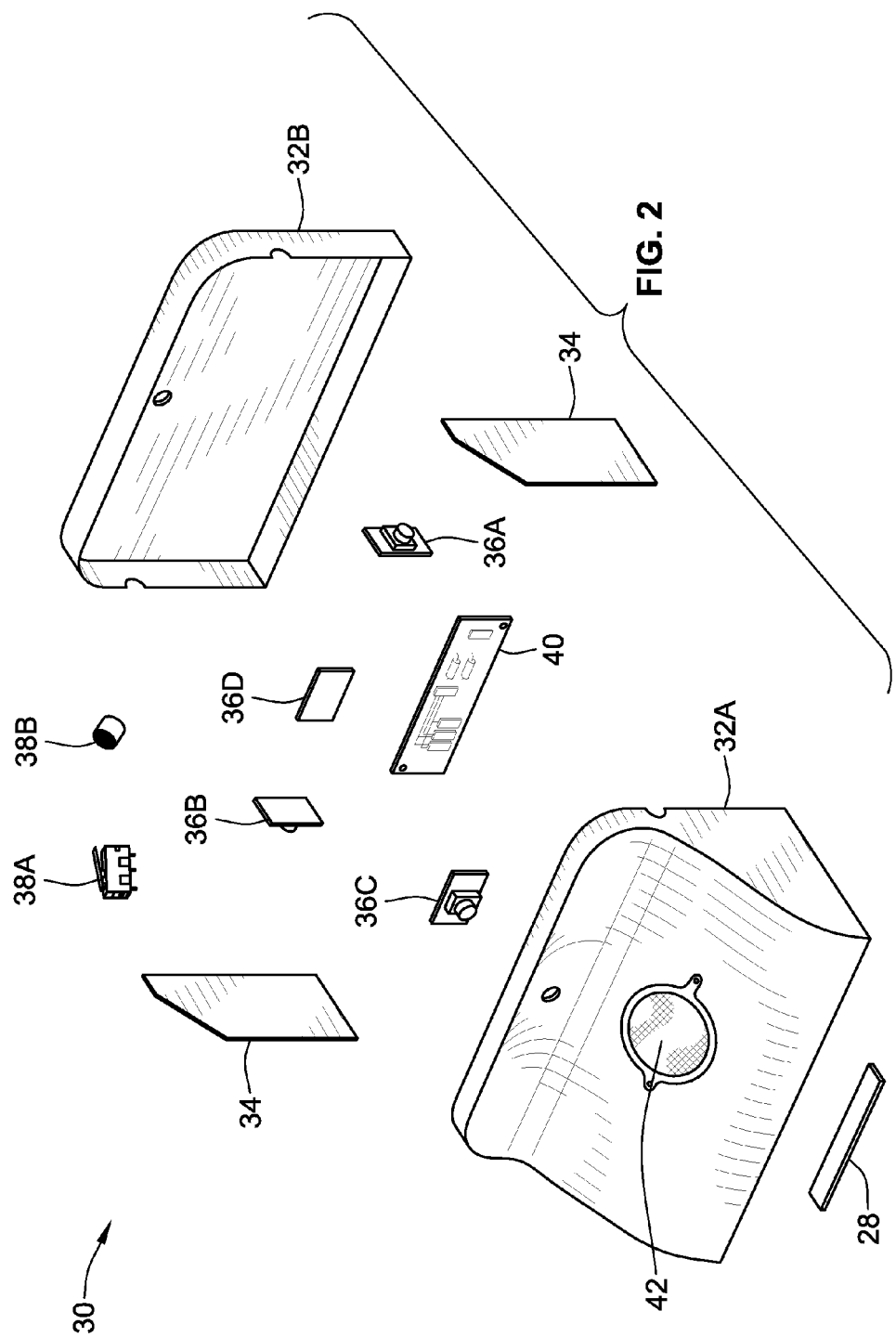
FIG. 2 is a partially exploded perspective-view illustration of the EVCS monitoring system of FIG. 1, shown as an optional retrofit security kit assembly.

FIGS. 1 and 2 illustrate an electric vehicle charging station (EVCS) 10 that includes a pedestal or housing 18 that is connected to an electrical power source, such as an electric utility grid and/or a buffer battery. Electric and hybrid-electric vehicles (not shown) are primarily powered by electric motors that draw from a rechargeable energy storage device, such as an onboard battery pack comprised of several interconnected battery modules. The vehicle typically has an electrical receptacle (e.g., an SAE J1772 compatible female socket) for receiving an electrical connector coupled to an electrical power supply for charging one or more batteries in the vehicle. As used herein, unless explicitly disclaimed, the term "electric vehicle" includes vehicles in which the powertrain uses only electrical power for propulsion and vehicles in which the powertrain uses both an electrical power source and/or an internal combustion engine for propulsion.

Within the pedestal 18, the electrical power source is operatively connected to one end of a power cable 12 via conventional safety devices, such as a circuit breaker or fuse. The other end of the power cable 12 is connected to a first end of an electrical connector (not visible in FIG. 1) contained within a handle 14. The second, open end of the connector includes multiple electrical terminals adapted to engage mating electrical terminals in the electrical receptacle that is standard equipment in electric vehicles. As mentioned above, the current standard for electrical connectors for charging electric vehicles in the United States is the SAE J1772 standard, for both the male and female electrical terminals used to connect the battery in an electric vehicle to an EVCS to re-charge the vehicle battery. A J1772 connector includes three conductors for connecting the positive, negative and neutral lines of the electrical power source to the positive and negative terminals of the vehicle battery, and a vehicle ground terminal, respectively. The battery then receives and stores electrical power for future use by the vehicle. The electrical connector may also contain data contacts that form an interface in a bus system, for example a CAN bus, by way of which data exchange can take place between a monitoring device on the vehicle side and a microprocessor-assisted control device on the EVCS side. In this manner, an electric vehicle connected with the EVCS can be identified and monitored, e.g., with regard to its charging state, during the charging process.

When the charging station 10 is not in use, the handle 14, and thus the electrical connector, is inserted into and stowed by a docking station 20 on the pedestal 18. In the illustrated embodiment, the docking station 20 (also referred to herein as "connector dock") is located at a preselected elevation on the pedestal 18 that is convenient for users of the charging station 10. The docking station 20 of FIG. 1 does not include any electrical connectors, but provides physical support and protection for the electrical connector when it is not in use. Specifically, the docking station 20 includes a hollow cylindrical receptacle (not visible in FIG. 1) having a complementary interior configuration that matches the exterior configuration of the electrical connector of the handle 14. These matching configurations are generally circular in the illustrated example, but include a longitudinal groove in the bottom of the receptacle for receiving a matching longitudinal rib on the connector to ensure the proper angular orientation of the connector as it is inserted into the receptacle.

A latching element can be used to retain the connector in the docking station 20 and, in some optional configurations, in the electrical receptacle of the vehicle. For some configurations, a handle latching element on the frontend of the handle 14 can be a snap-fit-type fastener such that, as the handle 14 is pushed into the docking station 20, a depending flange on the frontend of the handle latching element snaps over a mating flange on a stationary latching element in the docking station 20. Thus, the handle latching element and the handle 14 to which it is attached cannot be removed from the docking station 20 unless the handle latching element is first disengaged from the stationary latching element. In this example, the handle latching element can be moved out of engagement with the stationary latching element by pushing down on an actuator button 16 formed as an integral part of a trailing end portion of the handle latching element. The actuator button 16 protrudes through a hole in a top surface of the handle 14 so that the actuator button 16 is accessible from the exterior of the handle 14, thereby permitting a user to manually press the button 16 to release the latch when it is desired to remove the handle 14 from the docking station 20. When removing the electrical connector from a vehicle inlet (e.g., a compatible female socket), the actuator button 16 may also open a switch to trigger a vehicle charge control to provide controlled shutoff of charge power prior to disconnection.

Attached to the top of the pedestal 18 is an EVCS monitoring system 30 for monitoring the EVCS 10. As will be explained in further detail below, the EVCS monitoring system 30, in some implementations, allows a vehicle owner and/or a facility operator to remotely monitor and control the EVCS 10. The vehicle owner, via the internet or a mobile software application, can be enabled to: (a) view their electric vehicle and its surrounding areas; (b) change the field of view of one or more security cameras monitoring their vehicle (e.g., change the camera's direction and/or the focal length to zoom in or out); (c) monitor the status of vehicle charging; (d) receive alarms/notifications indicating completion of vehicle charging; and/or (e) enable/disable the charging process remotely. Likewise, the facility owner/operator, via the internet or a mobile software application, can be enabled to: (a) detect a vehicle as it is parking at and/or using an EVCS (e.g., a picture of the license plate may be taken and stored for security purposes); (b) detect if someone is approaching an EVCS and record his/her actions; (c) receive alarms/notifications indicating vandalism or damage to the EVCS; (d) notify the police or independent security company; (e) change the field of view of one or more of the security cameras; (f) enable/disable the charging process remotely; and/or (g) identify stolen vehicles.

Figure 5:
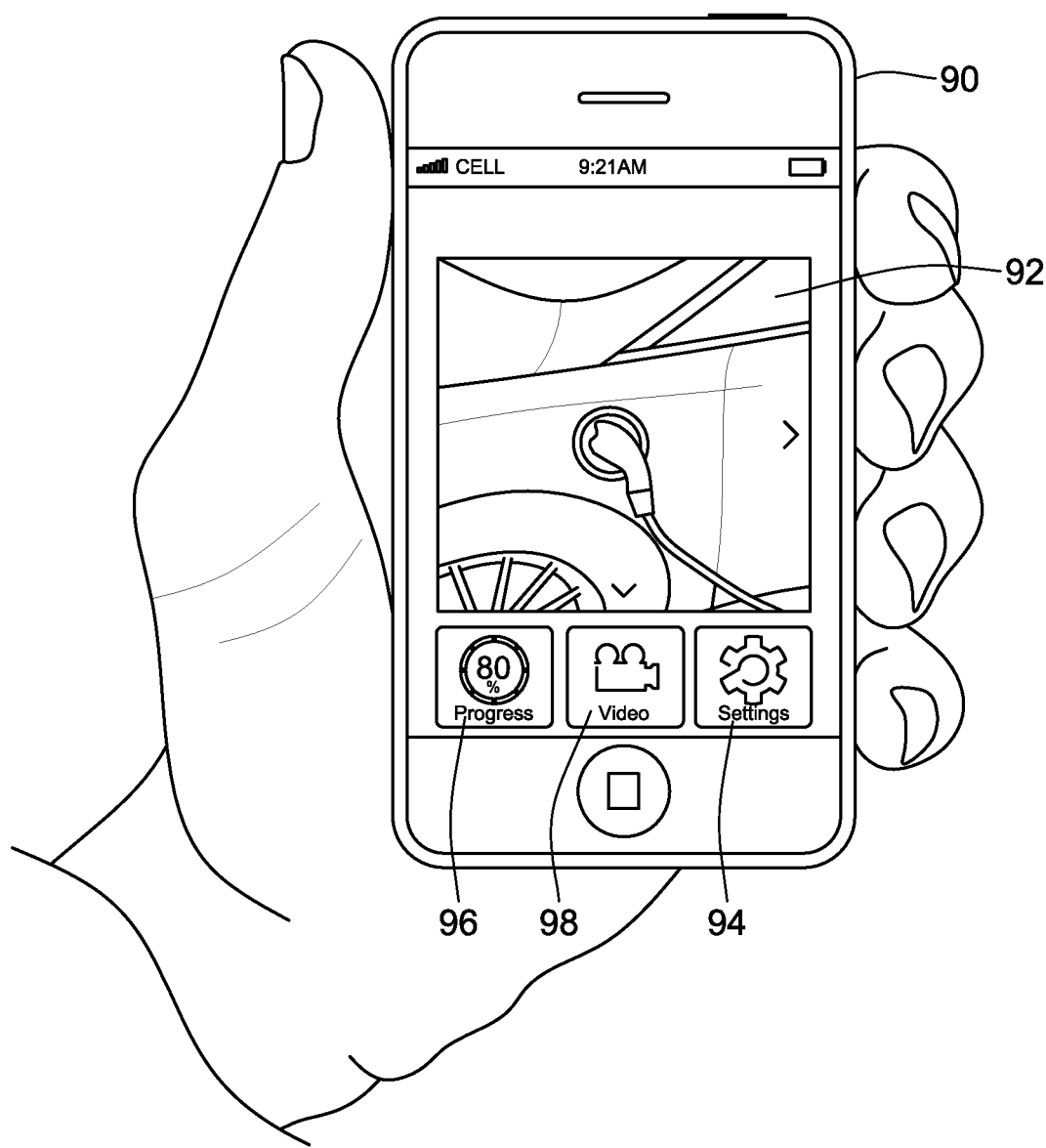
FIG. 5 is a front-view illustration of an exemplary mobile computing device with a representative dedicated, standalone mobile software application in accordance with aspects of the present disclosure.

In various aspects, the vehicle owner and/or facility operator have a mobile computing device, such as the smartphone 90 of FIG. 5, which includes a web browser or a dedicated, standalone software application, or a combination of both. In some embodiments, a user manually requests a web page from a security-system host server to enable some of the above features. In addition, or as an optional alternative, the dedicated software application automatically makes requests with the web browser and outputs information to the user. The mobile computing device can take on various forms, including without limitation a laptop computer (e.g., the Apple MACBOOK™ or the Dell ULTRABOOK™, a smartphone (e.g., the Apple IPHONE™ or the Samsung GALAXY™ S III), a personal digital assistant (PDA) (e.g., the HP IPAQ™ 210 ENTERPRISE™ Handheld PDA or the PALM TUNGSTEN™ E2 Handheld PDA), a tablet computer (e.g., the Samsung GALAXY™ TAB tablet device and the Apple IPAD tablet device), and an e-reader (e.g., the KINDLE™ electronic reader device), as some non-limiting examples. It may be desirable, in some preferred embodiments, for the user's mobile computing device to be an internet-capable cellular-enabled device.

With reference to both FIGS. 1 and 2, the EVCS monitoring system 30 includes a housing 32 (also referred to herein as "kit housing") for physically supporting and protecting various input devices, output devices, and input/output devices. The housing 32 is shown in FIG. 1 mounted to the top of the charging station 10, mechanically coupled to the pedestal 18 via a pair of attachment arms 34 that are bolted, fastened, welded or otherwise coupled to opposing sidewalls of the pedestal 18. An optional magnet 28 (FIG. 2) may be employed as an additional/alternative means of attachment for coupling the housing 32 to the pedestal 18. FIG. 2 may be representative of embodiments where the EVCS monitoring system 30 is packaged and sold as a retrofit security kit. In alternate arrangements, the housing 32 can be integrally formed with the pedestal 18, thereby eliminating the need for the attachment arms 34 and/or magnet 28. In other arrangements, a separate housing can be omitted altogether and the EVCS monitoring system 30 can be integrated directly into the EVCS assembly 10. In this regard, the housing is shown in FIG. 2 as comprising a front enclosure section 32A that attaches to a rear enclosure section 32B to form the protective outer housing 32 of the EVCS monitoring system 30. Nevertheless, the enclosure sections 32A, 32B may be formed as a single-piece structure, such as a polymeric casing of polyethylene terephthalate (PET), polyethylene terephthalate glycol (PETG), polyolefin (PO), etc., that is hydroformed into the desired size and shape, for example.

Figure 3:
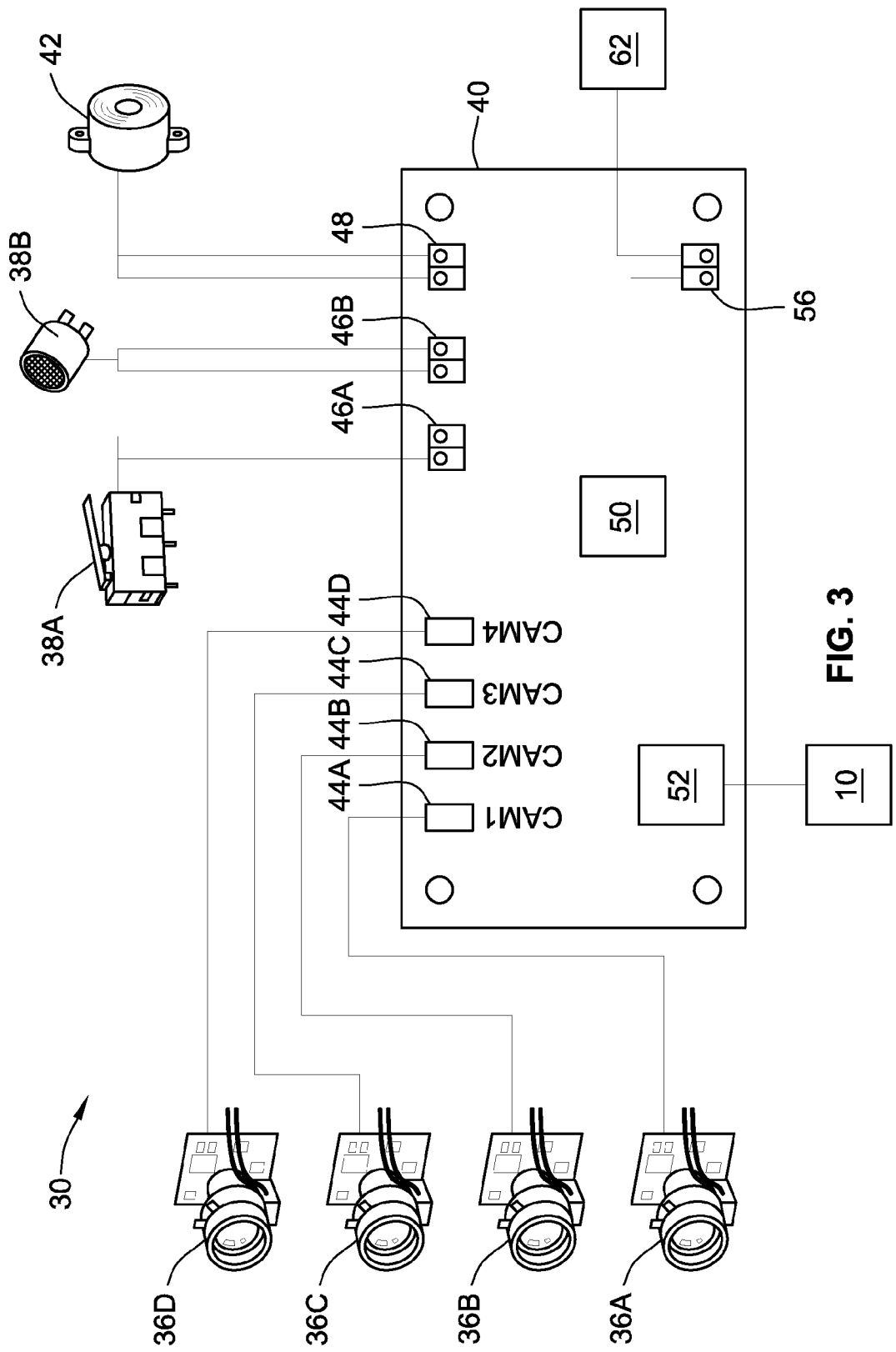
FIG. 3 is a schematic illustration of the EVCS monitoring system of FIG. 1.

The EVCS monitoring system 30 of FIGS. 1-3 includes one or more digital cameras 36A-D, one or more sensors 38A and 38B, and a controller 40. Optionally, the EVCS monitoring system 30 may also include an alarm mechanism, such as a 24V AC/DC warning buzzer 42, that is operable to output an audible (anti-vandalism) warning. As an additional option, or alternative, the monitoring system 30 may comprise an alarm mechanism that provides a visible warning, such as an LED or halogen warning strobe light (not shown). Stowed in whole or in part inside the protective outer housing 32, the first and second digital cameras 36A and 36B may be mounted to and project through opposing sidewalls of the housing 32 of the EVCS 10, whereas the third and fourth digital cameras 36C and 36D may be mounted to and project through front and back walls, respectively, of the housing 32. In addition, the alarm mechanism 42 may be mechanically coupled to the front enclosure section 32A via rivets, while the controller 40, represented in part as a printed circuit board, is mounted inside the housing 32 via a bezel (not shown). Other points of attachment and means of attachment are certainly envisioned as being within the scope and spirit of the present disclosure.

Each of the digital cameras 36A-D is configured to record images (video and/or still) of a surrounding area of the EVCS 10 and output a camera signal indicative thereof. As used herein, the term "record image" can be defined to include, for example, converting an optical image into an electronic signal. In some embodiments, recording an image may also include storing the image in a memory device, such as a Chip Card Interface Device (CCID). As shown, each digital camera 36A-D comprises a printed circuit board (PCB) camera, which may be in the nature of a black-and-white or color 2.1 mm wide-angle surveillance PCB camera. Alternative configurations of the EVCS monitoring system 30 may include greater or fewer than four digital cameras 36A-D. By way of example, the EVCS monitoring system 30 may utilize a single swivel-mounted camera that can rotate, in some embodiments, 360 degrees such that the user can view the entire area surrounding the EVCS 10. The cameras 36A-D could also be configured to pan up and down. With the foregoing configurations, the digital cameras 36A-D can be used to monitor, record, and/or output images of the surrounding areas of the EVCS 10, including vehicles and people near the EVCS 10.

The EVCS monitoring system 30 also includes sensing mechanisms that are operable, independently or through cooperative operation, to detect activities around and changes to the EVCS 10. The first sensor 38A, for example, is a switch sensor configured to detect removal of the electrical connector from the EVCS, and output a first sensor signal indicative thereof. In particular, the first sensor 38A, which is shown in FIG. 1 mounted to the docking station 20 of the EVCS 10, detects when the electrical connector handle 14 is intentionally or inadvertently pulled from and, optionally, returned to the docking station 20. The second sensor 38B, in contrast, is a proximity sensor configured to detect objects within a predetermined proximity (e.g., four meters or less) of the EVCS 10, and output a second sensor signal indicative thereof. Specifically, the second sensor 38B, which is shown in FIG. 1 mounted to the front fascia of the EVCS pedestal 18, detects when objects, such as vehicles, patrons, and loiterers, are immediately adjacent or close to the EVCS 10. It may be desirable, in some preferred embodiments, for the first sensor 38A to be a micro switch (e.g., a 4 A microSW snap-action lever-actuated safety switch), while the second sensor 38B is an ultrasonic proximity sensor (e.g., SU, UK and TU series round-body reflective ultrasonic proximity sensors). There are numerous other types of sensing devices that can also be used, including, for example, thermal sensing devices, such as infrared sensors, optical sensing devices, such as light- and laser-based sensors, acoustic sensing devices, such as surface acoustic wave (SAW) and ultrasonic sensors, capacitive sensing devices, such as capacitive-based proximity sensors, etc. Alternative configurations of the EVCS monitoring system 30 may include greater or fewer than two sensors 38A-B, which may be located at similar or different locations than those shown in the drawings.

A controller 40 is operatively coupled to the digital camera(s) 36A-D, the sensor(s) 38A-B, and the alarm mechanism 42. Controller 40 is represented herein, at least in part, by a 4 Channel Video-to-Ethernet SW surveillance PCB. For some configurations, the controller 40 may comprise specific "intelligence"—e.g., a central processing unit (CPU) 50 that is connected to a main memory (not shown), which can be integrated with the CPU or provided as a separate component. The CPU 50 may include any suitable processor(s), such as those made by Intel® and AMD®. CPU, as used herein, comprises any combination of hardware, software, or firmware disposed inside or outside of the kit housing 32 that is configured to communicate with and/or control the transfer of data between the EVCS monitoring system 30 and a bus, another computer, processor, device, service, or network. The controller 40 is communicatively connected to each of the digital cameras 36A-D via a respective PCB terminal: the first camera 36A, for example, is wired/wirelessly coupled to a first camera terminal 44A; the second camera 36B is wired/wirelessly coupled to a second camera terminal 44B; the third camera 36C is wired/wirelessly coupled to a third camera terminal 44C; and, the fourth camera 36D is wired/wirelessly coupled to a fourth camera terminal 44D. Likewise, the first sensor 38A is wired/wirelessly coupled to the controller 40 via a first sensor terminal 46A, whereas the second sensor 38B is wired/wirelessly coupled to the controller 40 via a second sensor terminal 46B. The alarm mechanism 42 can be wired/wirelessly coupled to the controller 40 via an alarm terminal 48. A data bus 52, such as an RS485 serial interface, communicatively connects the EVCS monitoring system 30 to the EVCS 10. In various aspects, the communication can be wired (e.g., Ethernet, RS485, etc.), wireless (Wi-Fi, Zigbee, cellular, Bluetooth, etc.), or interconnected via other known means of communication. Also provided is a power terminal 56 for connecting to and receiving power from a volts direct current (VDC) power source 62.

Figure 4:
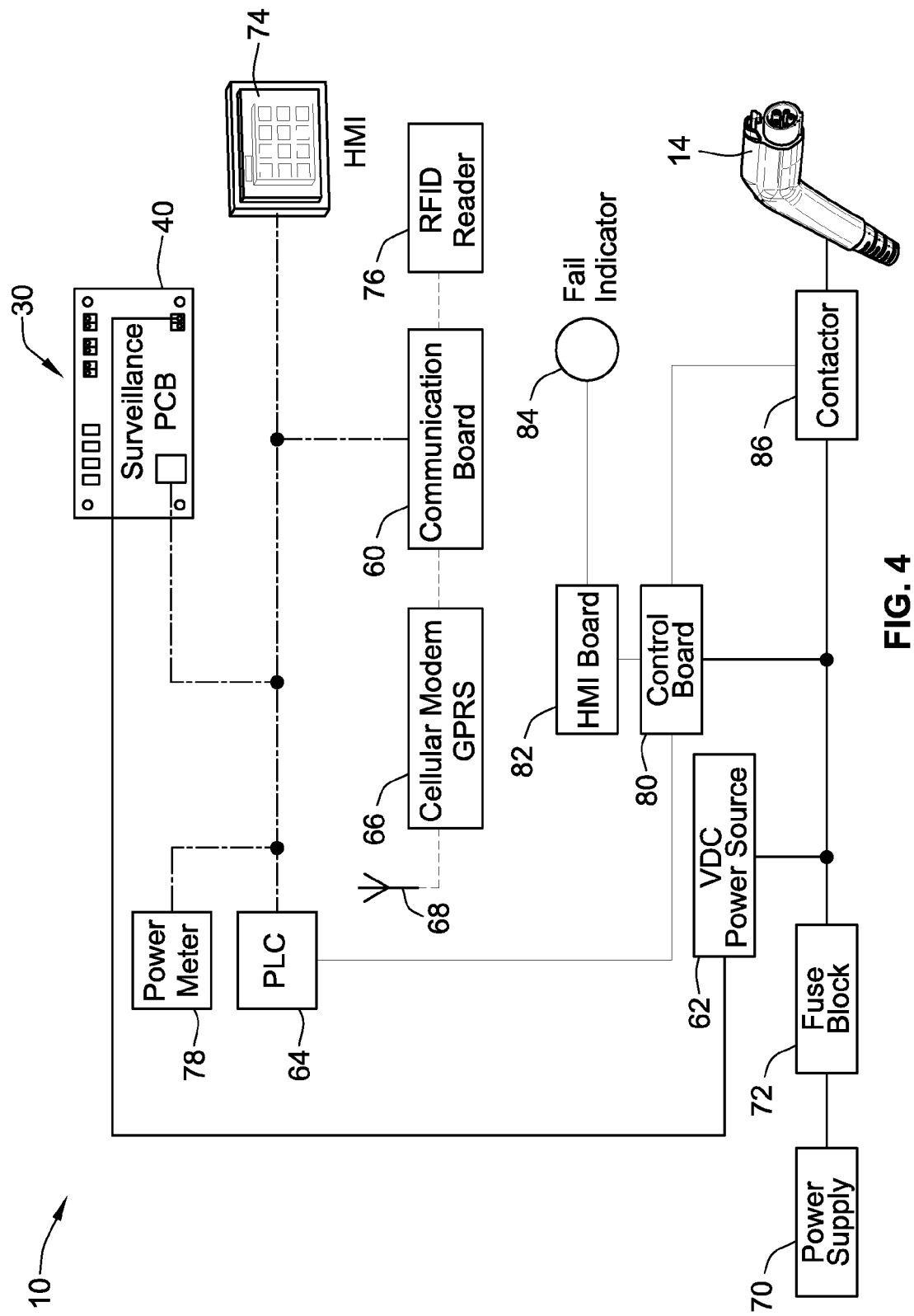
FIG. 4 is a schematic illustration of the exemplary EVCS and representative EVCS monitoring system of FIG. 1.

FIG. 4 is a schematic illustration of the exemplary EVCS 10 and representative EVCS monitoring system 30 of FIG. 1. As shown, the EVCS monitoring system 30, namely the controller 40, is communicatively coupled to a communication board 60 and a power logic controller (PLC) 64 to transmit information therebetween. The communication board 60, in turn, is operatively coupled to a general packet radio service (GPRS) cellular modem 66 to transmit information to and receive information from a network 68. Communication can take place through any now-known or hereinafter developed media, such as telephone lines (e.g., Dial-Up), local area network (LAN) or wide area network (WAN) links (e.g., Ethernet, T(X) lines, X.25, etc.), broadband connections (e.g., Integrated Service Data Network (ISDN), Frame Relay, etc.), wireless links (e.g., infrared, Bluetooth®, WiFi or WLAN), cellular networks, and so on. The network 68, in at least some embodiments, can typically carry TCP/IP protocol communications, and HTTP/HTTPS requests made by a web browser and associated responses and replies, and the connection between client software and a server can be communicated over such TCP/IP networks. Some non-limiting examples of networks that can serve as the communications network 66 include a wireless or wired Ethernet-based intranet, a local or wide-area network (LAN or WAN), and/or a global communications network, such as the Internet, which can be configured to accommodate many different communications media and protocols.

As discussed above, the controller 40 draws power from a VDC power source 62 of the EVCS 10. The VDC power source 62, in turn, draws power from a power supply 70 by way of a fuse block 72. The power supply 70 can be, for example, a 120 VAC power supply capable for providing current up to 16 A, consistent with Level I AC electric vehicle supply equipment (EVSE), as provided in SAE J1772. For example, the EVCS 10 can be a charging station directed to residential use at the home or garage of an electric vehicle's owner. Such a charging station is more economical; however, because of the limits on the power it can supply, this type of EVSE recharges vehicle batteries more slowly. The power supply 70 can also be a 240 VAC power supply capable for supplying up to 80 A, consistent with a Level II AC EVSE. For example, the EVCS 10 can be a charging station at a retail establishment, such as a gas station, drug store, or grocery store. The power supply 104 could also be a Level III AC EVSE.

The EVCS 10 also includes some other primary and peripheral componentry, including a computerized human machine interface (HMI) 74 and a radio frequency identification (RFID) reader 76, both of which are operable for receiving inputs from a user. For some configurations, the HMI 66 provides the user with a graphics-based platform for controlling designated operations of the EVCS 10. The RFID reader 76, on the other hand, provides a means by which the user can be identified with a personalized RFID tag, which can be used for security purposes and/or to submit electronic payments for using the EVCS 10. A power meter 78 monitors the power supplied by the EVCS 10 to the battery of the electric vehicle (e.g., the current supplied to the vehicle over a specific period of time). An HMI Board 80 is hardware for controlling the information displayed on the HMI 74. A control board 82, which may include a central processing unit (CPU), controller, and/or processor, is operatively connected to the other components of the EVCS 10 and controls the overall functionality of the EVCS 10. A fail indicator 84 can be operable to detect various system failures, such as a line fault, processor failure, power supply fault or network connection failure. An optional contactor 86 determines if the handle is connected to the vehicle. The control board 82 can be coupled to a memory, which can be integrated with the CPU or a separate component. A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, can be used for the memory.

When the system sensor(s) 38A, 38B detect any of a predetermined number of changes, the EVCS monitoring system 30 will automatically activate the digital cameras 36A-D, and enable communication with the user such that information and command signals can be transmitted therebetween. By way of non-limiting example, the controller 40 can receive the sensor signal(s) output from the sensors 38A, 38B, e.g., via the first and second sensor terminals 46A, 46B. Responsive to the received sensor signal(s) indicating that an object, such as a person or a vehicle, is within a predetermined proximity of the EVCS 10, and/or that the electrical connector (e.g., handle 14) is removed from the docking station 20 of the EVCS 10, the controller 40 activates one or more of the digital cameras 36A-D, which then record images of one or more surrounding areas of the EVCS 10. Signals from activated digital camera(s) 36A-D are then transmitted by the controller 40 (e.g., via the communication board 60 and GPRS cellular modem 66) to a user such that the user can view the images of the surrounding areas of the EVCS 10. The controller 40 also responsively enables the user to submit command signals that are operable to change an operational state of the EVCS 10 and/or security system 30.

In accord with aspects of the disclosed concepts, the user may be provided with a dedicated, standalone mobile software application (more commonly known as "mobile app" or just "app") that is operable to download to a mobile computing device and communicate with the security system 30. FIG. 5, for example, illustrates an exemplary mobile computing device, represented herein by smartphone 90, with a representative dedicated, standalone mobile software application 92. The mobile computing device 92 can use the dedicated, standalone application software 92 to conduct many of the herein disclosed features and options. The dedicated application software can be implemented in various forms. For instance, the dedicated application software can be in the form of a web-based (e.g., Java) applet that is downloaded to the mobile computing device and runs in conjunction with a web browser on the mobile computing device. Optionally, the dedicated application software can be in the form of a standalone software application, which can be implemented in a multi-platform language such as .Net or Java, or in native processor executable code. If executed on the mobile computing device, the dedicated application software can be operable to open a network connection with a security system server over the communications network and, thus, communicates via that connection with the servers. In some embodiments, the dedicated application software communicates with a single "host" or "client" server, which in turn conducts any necessary communications with one or more "third party" servers to complete a particular transaction. Optionally, the dedicated application software and web browser can be part of a single client-server interface, where the software can be implemented as a "plug-in" to the web browser, for example. Other optional variations and known alternatives are considered to be within the scope and spirit of the present disclosure.

As seen in FIG. 5, the controller 40 can transmit the camera signals to the dedicated, standalone mobile software application 92 operating on the user's mobile computing device 92 such that the images of the surrounding area of the EVCS 10 can be viewed by the user on the mobile computing device 90. Other outputs can include the mobile app 92 receiving from the controller 40 the status of vehicle charging, and displaying the status of vehicle charging to the user in a progress field/button 96 (e.g., 80% complete in FIG. 5). As another option, the mobile app 92 can receive from the controller 40 and provide to the user a notification indicating completion of vehicle charging. Notification of completion of vehicle charging can be made, for example, by way of a push notification, email, text message, or any other logically applicable form of electronic communication, and can optionally be displayed within the progress field 96. The controller 40 may also be operable to output to the user via the app 92 a notification indicating that the EVCS 10 has been damaged or vandalized. In this regard, the controller 40 can be configured to automatically output to a police department or an independent security company a notification of such vandalism/damage to the EVCS 10. To protect the digital cameras 36A-D from vandalism, optional configurations of the EVCS monitoring system 30 can automatically activate the alarm mechanism 42, for example, when a person is detected near the EVCS 10 and one of the cameras 36A-D unexpectedly stops capturing image signals.

The mobile app 92 can also provide the user with various input features to control the EVCS 10 and system 30. For instance, the controller 40, responsive to a command signal received from the user, e.g., via pressing the progress button 96 on the mobile app 92, can enable and/or disable (e.g., pause and then reinitiate) the vehicle charging process of the EVCS 10. Moreover, the controller 40, responsive to command signals received from the user via a video display button 98, will change the field of view of one or more of the digital camera 36A-D. A settings button 94 of the app 92 can allow the user to personalize alarms and notifications, access a help menu and other informational options, notify the police/security if vandalism or theft is detected, and/or provide other features and functions to the user. The app 92 may also include user-selectable dropdown menus, popup windows, and the like, from which the user can retrieve additional information or provide other inputs and commands.

Aspects of this disclosure can be implemented, in some embodiments, through a computer-executable program of instructions, such as program modules, generally referred to as software applications or application programs executed by a computer. The software can include, in non-limiting examples, routines, programs, objects, components, and data structures that perform particular tasks or implement particular abstract data types. The software can form an interface to allow a computer to react according to a source of input. The software can also cooperate with other code segments to initiate a variety of tasks in response to data received in conjunction with the source of the received data. The software can be stored on any of a variety of memory media, such as CD-ROM, magnetic disk, bubble memory, and semiconductor memory (e.g., various types of RAM or ROM).

Moreover, aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network. In a distributed-computing environment, program modules can be located in both local and remote computer-storage media including memory storage devices. Aspects of the present disclosure can therefore, be implemented in connection with various hardware, software or a combination thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it can be implemented by an application specific integrated circuit (ASIC), a programmable logic device (PLD), a field programmable logic device (FPLD), discrete logic, etc.). Also, some or all of the machine readable instructions represented in any flowchart depicted herein can be implemented manually. Further, although specific algorithms are described with reference to flowcharts depicted herein, persons of ordinary skill in the art will readily appreciate that many other methods of implementing the example machine readable instructions can alternatively be used. For example, the order of execution of the blocks can be changed, and/or some of the blocks described can be changed, eliminated, or combined.

While exemplary embodiments and applications of the present disclosure have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A security system for monitoring an electric vehicle charging station (EVCS) having a connector dock and an electrical connector for electrically coupling to an electric vehicle, the security system comprising:
    a digital camera configured to record images of a surrounding area of the EVCS and output a camera signal indicative thereof;
    a sensor configured to detect objects within a predetermined proximity of the EVCS or to detect removal of the electrical connector from the connector dock of the EVCS, or both, and output a sensor signal indicative thereof; and
    a controller operatively coupled to the digital camera and the sensor, the controller being configured to:
    receive the sensor signal output from the sensor; and
    responsive to the sensor signal indicating that an object is within the predetermined proximity of the EVCS or the electrical connector is removed from the connector dock of the EVCS:
        direct the digital camera to record images of the surrounding area of the EVCS;
        output to a user the camera signal indicative of the images of the surrounding area of the EVCS; and
        receive from the user a command signal operable to change an operational state of the EVCS, the security system, or both;
    wherein:
    the sensor is configured to detect removal of the electrical connector from the connector dock of the EVS, and output a signal indicative thereof; and
    the controller is configured to:
    receive the sensor signal output indicating that the electrical connector is removed from the connector dock of the EVCS; and
    responsive to the sensor signal indicating that the electrical connector is removed from the connector dock of the EVCS:
        direct the digital camera to record images of the surrounding area of the EVCS;
        output to a user the camera signal indicative of the images of the surrounding area of the EVCS; and receive from the user a command signal operable to change an operational state of the EVCS, the security system, or both.

2. The security system of claim 1, wherein the controller, responsive to the command signal received from the user, is further configured to change a field of view of the digital camera.

3. The security system of claim 1, wherein the controller is further configured to output to the user a status of vehicle charging.

4. The security system of claim 1, wherein the controller is further configured to output to the user a notification indicating completion of vehicle charging.

5. The security system of claim 1, wherein the controller, responsive to the command signal received from the user, is further configured to enable or disable, or both, a vehicle charging process of the EVCS.

6. The security system of claim 1, wherein the controller is further configured to output to the user a notification indicating vandalism or damage to the EVCS.

7. The security system of claim 1, wherein the controller is further configured to output to a police department or an independent security company a notification of vandalism or damage to the EVCS.

8. The security system of claim 1, wherein the controller is further configured to communicate with the user via a dedicated, standalone mobile software application operating on a mobile computing device, the mobile software application being configured to transfer information to and receive information from the security system.

9. The security system of claim 8, wherein the controller is further configured to output the camera signal to the dedicated, standalone mobile software application operating on the mobile computing device such that the images of the surrounding area of the EVCS can be viewed by the user on the mobile computing device.

10. The security system of claim 8, wherein the user command signal is received by the controller from the dedicated, standalone mobile software application operating on the mobile computing device of the user.

11. The security system of claim 1, wherein the digital camera comprises a plurality of printed circuit board (PCB) cameras.

12. The security system of claim 1, wherein the sensor comprises a proximity sensor configured to detect objects within a predetermined proximity of the EVCS, and a micro switch sensor configured to detect removal of the electrical connector from the EVCS.

13. The security system of claim 1, further comprising an alarm mechanism configured to output an audible warning or a visible warning, or both.

14. The security system of claim 1, wherein the EVCS has a housing, and wherein the digital camera, the sensor, and the controller are mounted to the housing of the EVCS.

15. A method of monitoring an electric vehicle charging station (EVCS) with a security system having a sensor and a digital camera, the EVCS having a connector dock and an electrical connector for electrically coupling to an electric vehicle, the method comprising:
  receiving from the sensor of the security system a first sensor signal indicating that an object is within a predetermined proximity of the EVCS, or a second sensor signal indicating that the electrical connector has been removed from the connector dock of the EVCS; and
  responsive to receiving the first sensor signal or the second sensor signal:
    directing the digital camera to record images of a surrounding area of the EVCS and output a camera signal indicative thereof;
    transmitting to a user the camera signal indicative of the images of the surrounding area of the EVCS; and
    receiving from the user a command signal operable to change an operational state of the EVCS, the security system, or both;
  the method further comprising:
  receiving from the sensor of the security system the second sensor signal indicating that the electrical connector has been removed from the connector dock of the EVCS; and
  responsive to receiving the second sensor signal:
    directing the digital camera to record images of the surrounding area of the EVCS and output a camera signal indicative thereof;
    transmitting to a user the camera signal indicative of the images of the surrounding area of the EVCS; and
    receiving from the user a command signal operable to change an operational state of the EVCS, the security system, or both.

16. A security kit for monitoring an electric vehicle charging station (EVCS) having a housing, a connector dock, and an electrical connector attached to the housing and configured to electrically couple the EVCS to an electric vehicle, the security kit comprising:
  a digital camera configured to attach to the EVCS housing, the digital camera being configured to record images of a surrounding area of the EVCS and output a camera signal indicative thereof; and
  first and second sensors configured to attach to the EVCS housing, the first sensor being configured to detect objects within a predetermined proximity of the EVCS and output a first sensor signal indicative thereof, the second sensor being configured to detect removal of the electrical connector from the connector dock of the EVCS and output a second sensor signal indicative thereof,
  a controller operatively coupled to the digital camera and the first and second sensors, wherein the controller, responsive to receiving the first sensor signal or the second sensor signal, is configured to:
    direct the digital camera to record images of the surrounding area of the EVCS;
    output to a user the camera signal indicative of the images of the surrounding area of the EVCS; and
    receive from the user a command signal operable to change an operational state of the EVCS, the security kit, or both;
  wherein the controller, responsive to receiving the second sensor signal, is configured to:
    direct the digital camera to record images of the surrounding area of the EVCS;
    output to a user the camera signal indicative of the images of the surrounding area of the EVCS; and
    receive from the user a command signal operable to change an operational state of the EVCS, the security kit, or both.

17. The security kit of claim 16, further comprising a data bus configured to communicatively connect the security kit to the EVCS.

18. The security kit of claim 16, further comprising a kit housing stowing therein the digital camera and the controller, the kit housing being operable to mount to the EVCS housing.

19. The security kit of claim 16, wherein the first sensor is a proximity sensor and the second sensor is a micro switch sensor, and wherein the digital camera comprises a plurality of printed circuit board (PCB) cameras.

20. The security kit of claim 16, further comprising an alarm mechanism configured to output an audible warning or a visible warning, or both.

* * * * *